United States Patent
Kubo et al.

(10) Patent No.: US 7,082,545 B2
(45) Date of Patent: Jul. 25, 2006

(54) METHOD OF AND DEVICE FOR DETECTING CABLE CONNECTION

(75) Inventors: Kenji Kubo, Hyogo (JP); Wataru Tanaka, Hyogo (JP); Hiroyuki Maemura, Hyogo (JP)

(73) Assignees: Renesas Technology Corp., Tokyo (JP); Mitsubishi Electric System LSI Design Corporation, Itami (JP)

( * ) Notice: Subject to any disclaimer, the term of this patent is extended or adjusted under 35 U.S.C. 154(b) by 748 days.

(21) Appl. No.: 09/971,674

(22) Filed: Oct. 9, 2001

(65) Prior Publication Data

US 2002/0156949 A1 Oct. 24, 2002

(30) Foreign Application Priority Data

Apr. 19, 2001 (JP) ............................. 2001-121010

(51) Int. Cl.
*G06F 1/26* (2006.01)
*G06F 1/32* (2006.01)

(52) U.S. Cl. ...................... 713/330; 713/300; 713/320; 713/323

(58) Field of Classification Search ...................... None
See application file for complete search history.

(56) References Cited

U.S. PATENT DOCUMENTS

| 5,528,248 | A | * | 6/1996 | Steiner et al. | .......... 342/357.06 |
| 6,131,134 | A | * | 10/2000 | Huang et al. | ................ 710/302 |
| 6,249,825 | B1 | * | 6/2001 | Sartore et al. | .................. 710/8 |
| 6,351,809 | B1 | * | 2/2002 | St. Pierre et al. | ................ 713/1 |
| 6,434,044 | B1 | * | 8/2002 | Gongwer et al. | ........... 365/226 |
| 6,727,952 | B1 | * | 4/2004 | Hirata et al. | ................. 713/324 |
| 6,904,488 | B1 | * | 6/2005 | Matsumoto et al. | ......... 713/320 |

FOREIGN PATENT DOCUMENTS

| JP | 10-187303 | 7/1998 |
| JP | 11-305880 | 11/1999 |
| JP | 11-352959 | 12/1999 |
| JP | 11-353061 | 12/1999 |

OTHER PUBLICATIONS

"Integrated Circuit (Digital ASSP) Presented by Mistsubishi", Jan. 7, 2000.

* cited by examiner

*Primary Examiner*—James K. Trujillo
(74) *Attorney, Agent, or Firm*—Buchanan Ingersoll PC

(57) ABSTRACT

The detector includes the plug for connecting the personal computer through a cable, battery power supply which provides a constant power supply, and the MCU which receives a specific potential from the personal computer when the later is connected.

5 Claims, 6 Drawing Sheets

METHOD OF AND DEVICE FOR DETECTING CABLE CONNECTION

FIELD OF THE INVENTION

The present invention relates to a method of and device for detecting wire connection between a personal computer and a peripheral device by the use of the technology of Universal Serial Bus ("USB").

BACKGROUND OF THE INVENTION

FIG. 6 is a block diagram showing a connection between the personal computer 1007 and the conventional detector 1001. The personal computer 1007 comprises the route hub 1005 and the plug 1004. The route hub 1005 is a host for communication using the USB. The route hub 1005 and the plug 1004 are connected through the power line VBUS and the resistance R2. Electric potential VBUS is supplied to the peripheral device from the personal computer through a power line.

The detector 1001 comprises the level conversion and protection circuit 1002, MCU 1003, plug 1009, and the resistance R1. The MCU 1003 and the plug 1009 are connected through the USB communication line transmitting electrical potential for a differential signal of a D+ voltage level, and the USB communication line transmitting electrical potential for a differential signal of a D− voltage level. The resistance R1 is connected between the MPU 1003 and the USB communication line transmitting D− electrical potential. The resistance R1 transmits an output VREG of a regulator built in the MCU 1003. The plug 1004 of the personal computer 1007 and the plug 1009 of the detector 1001 are connected through the cable 1006.

Potential VBUS from the personal computer 1007 is applied to the level conversion and protection circuit 1002 through the plugs 1004 and 1009. When the potential VBUS is received, the level conversion and protection circuit 1002 outputs the VBUS detection signal to the MCU 1003.

In the conventional detector 1001 the level conversion and protection circuit 1002 is provided outside the MCU 1003. Thus, reception of potential VBUS is detected in this level conversion and protection circuit 1002 that is an external circuit with respect to the MPU 1003. The MCU 1003 detects connection of the detector 1001 and the personal computer 1007 based on the VBUS detection signal output by the level conversion and protection circuit 1002. Thus, in the conventional detector 1001 the level conversion and protection circuit 1002 is required and therefore it is difficult to reduce the size of the circuit.

Some times the detector is provided with a built in battery power supply and this battery is charged using the potential received from the personal computer. However, in such a detector it is difficult to perform fine detection of the connection, therefore, more circuitry is required to be provided. Therefore, there is a problem that it is difficult to reduce the size of the circuit.

SUMMARY OF THE INVENTION

It is an object of this invention to provide an intelligent and small-sized detector that consumes less power.

The detector according to one aspect of this invention comprises a plug for connecting the detector to the personal computer through a cable; a battery power supply which outputs a predetermined constant electrical potential; and a Micro Control Unit which receives a specific electrical potential from the personal computer through the plug and cable, and receives the constant electrical potential from the battery power supply.

The detector according to another aspect of this invention comprises a plug for connecting the detector to the personal computer through a cable; a battery power supply which outputs a predetermined constant electrical potential; an oscillator which outputs an oscillation signal; and a Micro Control Unit which receives a specific electrical potential from the personal computer through the plug and cable, receives the constant electrical potential from the battery power supply, and receives the oscillation signal from the oscillator.

Other objects and features of this invention will become apparent from the following description with reference to the accompanying drawings.

DESCRIPTION OF THE PREFERRED EMBODIMENTS

Embodiments of a detector according to the present invention will be explained below with reference to the accompanying drawings.

Figure 1:
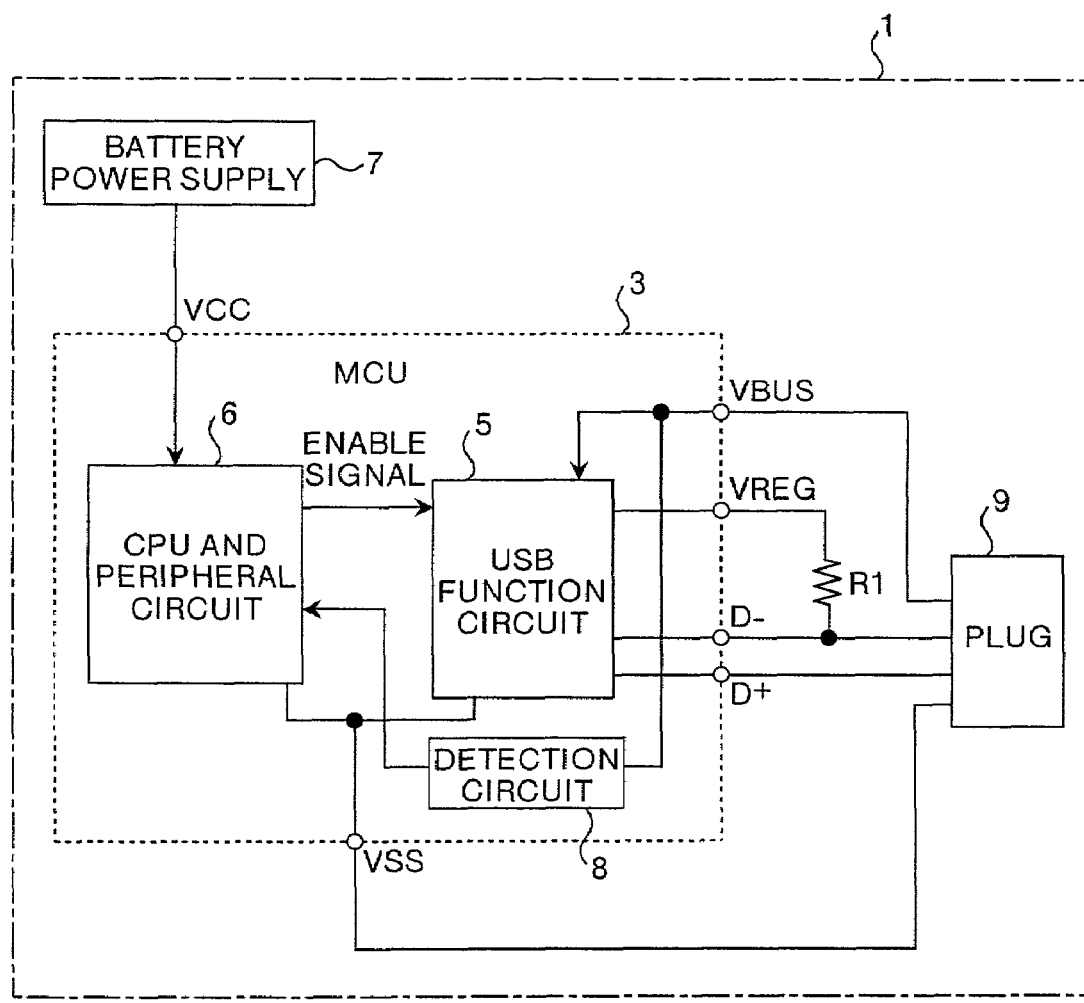
FIG. 1 is a block diagram of a detector according to a first embodiment.

FIG. 1 is a block diagram of the detector 1 according to a first embodiment of the present invention. The detector 1 comprises the MCU 3, the battery power supply 7, and the plug 9. The battery power supply 7 supplies a predetermined constant electrical potential to the MCU 3. The plug 9 supplies a specific electrical potential to the MCU 3.

The MCU 3 comprises the USB function circuit 5, the CPU and peripheral circuit 6, and the detection circuit 8. Moreover, the MCU 3 comprises a VCC terminal for input of a VCC level signal from the battery power supply 7, VSS terminal which is connected to the plug 9 for transmission of a standard level VSS (usually, earth electrical potential, and hereinafter, called as VSS), D+ terminal which is connected to the plug 9 for transmission of a D+ electric level, and a D− terminal which is connected to the plug 9 for transmission of a D−electric level.

The MCU 3 comprises a VREG terminal for transmission of output VREG of a regulator built in the USB function circuit 5, and a VBUS terminal which is connected to the plug 9 for transmission of VBUS (electrical potential supplied form the personal computer).

The USB function circuit 5 is connected to the VCC terminal, VSS terminal, D+ terminal, D− terminal, VREG terminal, and the VBUS terminal. The CPU and peripheral circuit 6 is connected to the VCC and VSS terminals. The CPU and peripheral circuit 6 performs on-off control of the USB function circuit 5 based on the output of the detection circuit 8. The detection circuit 8 is connected to the VBUS terminal, and the CPU and peripheral circuit 6. The resistance R1 whose one terminal is connected to the VREG terminal, and the other terminal is connected to a USB communication line for transmission of the D− electrical potential is provided. The D− electrical potential is pulled up by the resistance R1 at the VREG electrical potential in the case of low rate USB communication.

Although not shown here, the detector 1 is connected to a personal computer through the plug 9, cable, and a plug in the personal computer is the same manner as explained with reference to the conventional detector.

The D− electrical potential is pulled up to VREG X (R2/R1+R2)) V and the D+ electrical potential is pulled down by the resistance R2, as there is no output by the resistance R1 and the resistance R2 of the personal computer together with the MCU 3 and the route hub of the personal computer in the case of no communication.

Operations of the detector 1 will be described below. When the cable for connecting the detector 1 and the personal computer is connected to the plug 9, potential VBUS which is received from the personal computer is applied to the USB function circuit 5 and the detection circuit 8.

The detection circuit 8 supplies the potential VBUS to the CPU and peripheral circuit 6. The detection circuit 8 monitors the voltage level of VBUS supplied through the cable. The CPU and peripheral circuit 6 outputs an Enable signal for ON operation of the USB function circuit 5 so as to perform USB communication.

The USB function circuit 5 after the ON operation outputs the VREG electrical potential of the output of the built-in regulator. The VREG electrical potential is applied to the D− terminal while the D− electrical potential of the USB communication line is pulled up by the resistance R1.

The detection circuit 8 outputs a signal having a low logical level ("L") when the potential VBUS is Hi-Z and outputs a signal having high logical level ("H") when the potential VBUS is the specific electrical potential (for example, 5 V) to the CPU and peripheral circuit 6. In other words, the detection circuit 8 shall output a "L" signal when the detector and the personal computer are not connected to each other, because, in this case the potential VBUS will be equal to Hi-Z. On the other hand, the detection circuit 8 shall output a "H" signal when the detector and the personal computer are connected to each other, because, in this case the potential VBUS will be equal to the specific electrical potential.

Thus, whether the detector and the personal computer are connected to each other can be detected by the CPU and peripheral circuit 6 based on the changes in the voltage level of VBUS supplied from the detection circuit 8. Accordingly, the MCU 3 functions as a communication controller using the USB between the detector 1 and the personal computer.

According to the first embodiment, more intelligent connection detection using the MCU, compared with that of a conventional detector, may be realized by provision of the MCU provided with the detection circuit.

Moreover, the MCU has an advantage that the MCU eliminate a special circuit, which has been conventionally required for detection, as the MCU may have a control function as a peripheral device (not shown).

When the detector 1 and the personal computer are not connected to each other, the peripheral device is activated based on the built in battery power supply. In this case, the potential VBUS is not input into the USB function circuit. The USB function circuit may be made to stop its operation when the potential VBUS is not received, which shall lead to reduced power consumption. The USB function circuit may be made to restart its operation when the detector and the personal computer are once more connected to each other. Moreover, the MPU 3 may be made to charge the battery power supply using the potential VBUS.

Figure 2:
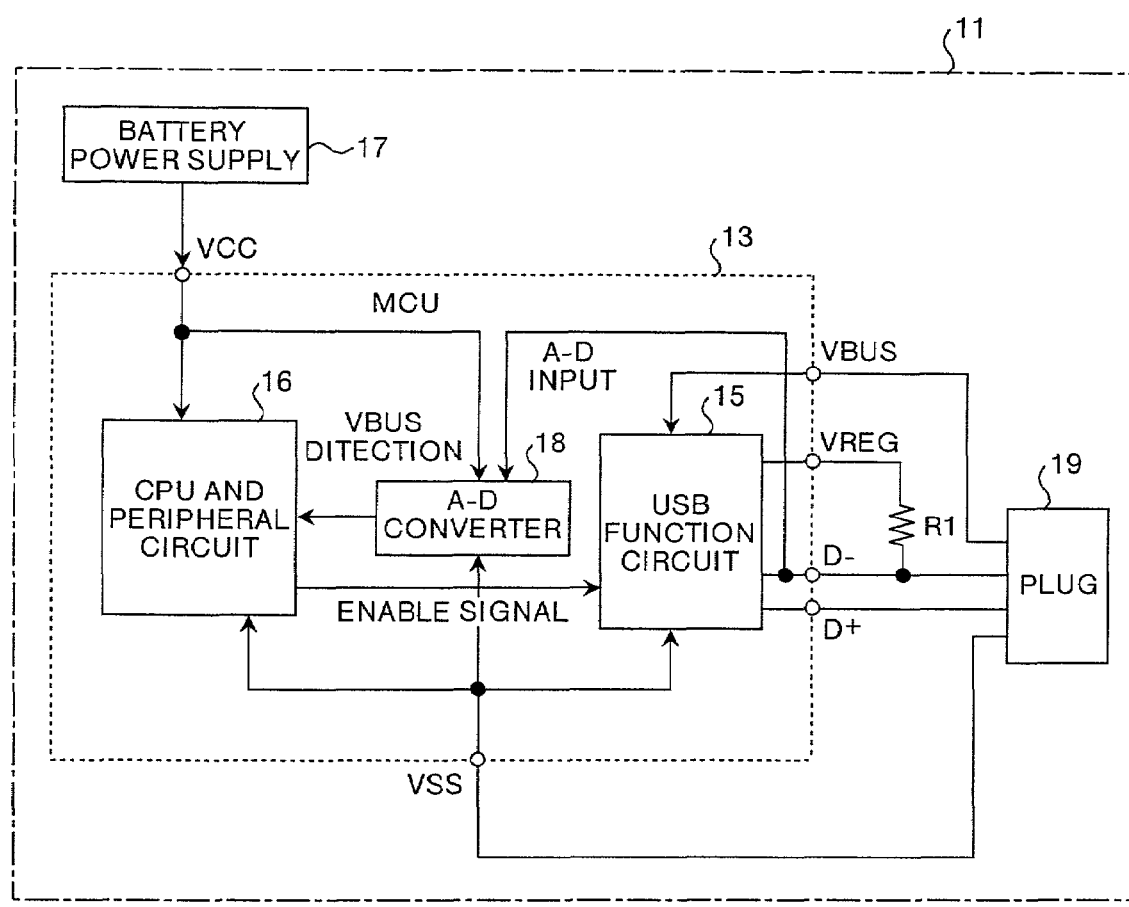
FIG. 2 is a block diagram of a detector according to a second embodiment.

FIG. 2 is a block diagram of a detector 11 according to a second embodiment of the present invention. The detector 11 comprises MCU 13, battery power supply 17 for supplying of predetermined electrical potential to the MCU 13, and the plug 19 transmitting specific electrical potential to the MCU 13.

The MCU 13 comprises the USB function circuit 15, CPU and peripheral circuit 16, and the A-D converter 18. Moreover, the MCU 13 comprises a VCC terminal for input of a VCC level signal from the battery power supply 17, VSS terminal which is connected to the plug 19 for transmission of a standard level VSS, D+ terminal which is connected to the plug 19 for transmission of a D+ electric level; and a D− terminal which is connected to the plug 19 for the transmission of a D− electric level. The MCU 13 also includes a VREG terminal for transmission of an output VREG of a regulator built in the USB function circuit 15 and a VBUS terminal which is connected to the plug 19 for transmission of VBUS (electrical potential supplied from the personal computer).

The USB function circuit 15 is connected to the VCC terminal, VSS terminal, D+ terminal, D− terminal, VREG terminal, and the VBUS terminal. The A-D converter 18 is connected to the VCC terminal, VSS terminal, and the D− terminal. The A-D converter 18 performs conversion of the D− electrical potential to a digital value for transmission to the CPU and peripheral circuit 16. The CPU and peripheral circuit 16 is connected to the VCC and VSS terminals. The CPU and peripheral circuit 16 performs on-off control of the USB function circuit 15 based on the output of the A-D converter 18. The resistance R1 whose one terminal is connected to the VREG terminal, and the other terminal to a USB communication line for transmission of the D− electrical potential is provided. The D− electrical potential is pulled up at the VREG electrical potential in the case of low rate USB communication.

Although not shown here, the detector 11 is connected to a personal computer through the plug 19, cable, and a plug in the personal computer is the same manner as explained with reference to the conventional detector.

Moreover, the D− electrical potential is pulled up to VREGX (R2/(R1+R2)) V and the D+ electrical potential is pulled down by the resistance R2, as there is no output by the resistance R1 and the resistance R2 of the personal computer together with the MCU 13 and the route hub of the personal computer in the case of no communication.

The detector 11 operates as follows. The D− electrical potential of the USB communication line is divided by the resistance R1 and the resistance R2 provided in the personal computer, in a state the cable is connected to the plug 19 and there is no communication.

The divided electrical potential is input to the A-D converter 18 as an A-D input. The A-D converter 18 outputs the VBUS detection signal to the CPU and peripheral circuit 16.

The CPU and peripheral circuit 16 outputs the Enable signal to the USB function circuit 15 to perform on-off operation of the USB function circuit 15, and the USB function circuit 15 outputs the output VREG of the built-in regulator.

The VREG electrical potential is transmitted to the D− terminal while the D− electrical potential of the USB communication line is pulled up by the resistance R1.

When the detector 11 and the personal computer are not connected to each other, the D− electrical potential becomes equal to the output VREG of the regulator. Accordingly, whether the detector and the personal computer are connected to each other can be detected based on the detection of the difference in the D− electrical potential between the connection state of the cable and the non-connection state of the cable. That is, the difference in the digital values caused by the connection/non-connection states of the cable may be used as detection unit.

According to the second embodiment, the similar advantages to those of the first embodiment may be expected by provision of the MCU comprising the A-D converter, and, if the A-D converter is essentially required as a function of a personal computer peripheral device, common use of the converter may be advantageously realized.

Figure 3:
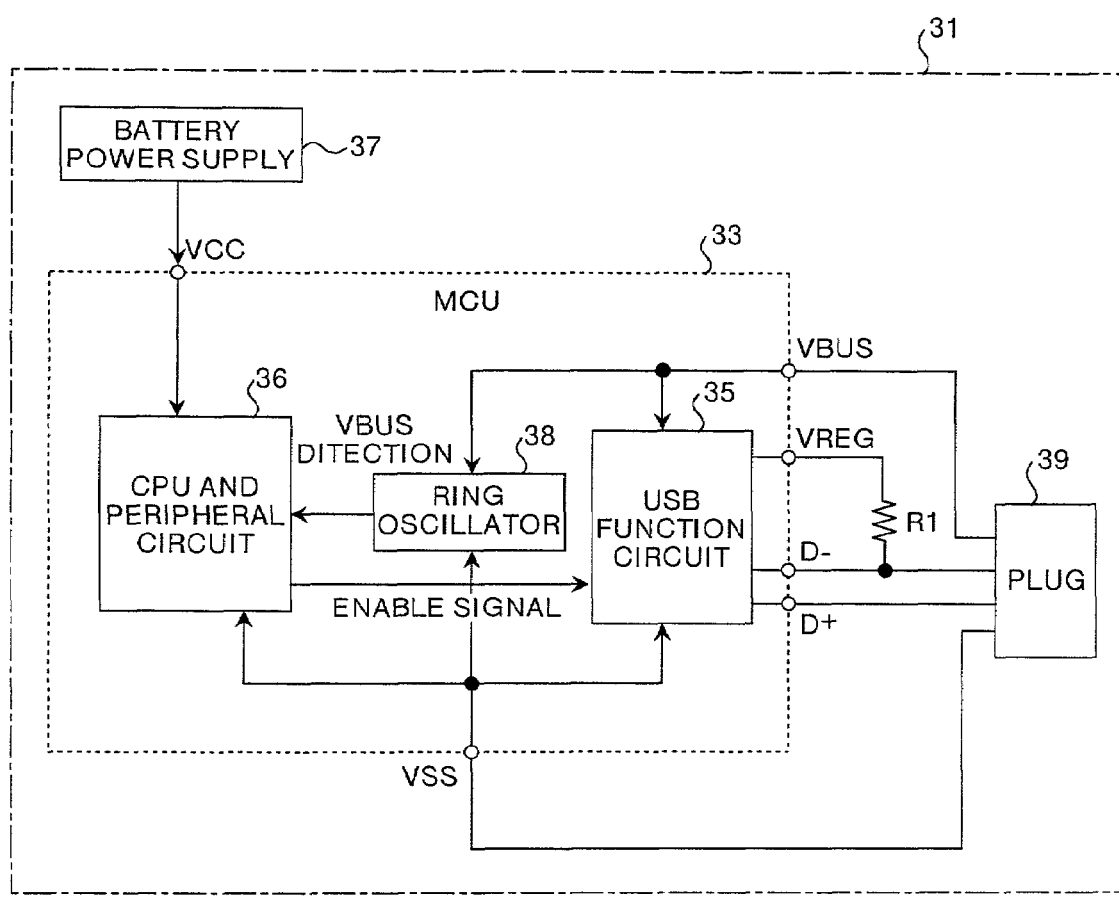
FIG. 3 is a block diagram of a detector according to a third embodiment.

FIG. 3 is a block diagram of a detector 31 according to a third embodiment of the present invention. The detector 31 comprises the MCU 33, battery power supply 37 for supplying of predetermined electrical potential to the MCU 33, and the plug 39 transmitting specific electrical potential to the MCU 33.

The MCU 33 comprises the USB function circuit 35, CPU and peripheral circuit 36, and the ring oscillator 38. Furthermore, the MCU 33 comprises a VCC terminal for input of a VCC level signal from the battery power supply 37, VSS terminal which is connected to the plug 39 for transmission of a standard level VSS, D+ terminal which is connected to the plug 39 for transmission of a D+ electric level, and a D− terminal which is connected to the plug 39 for transmission of a D− electric level. The MCU 33 also includes a VREG terminal for transmission of output VREG of a regulator built in the USB function circuit 35, and a VBUS terminal which is connected to the plug 39 for transmission of VBUS (electrical potential supplied from the personal computer).

The USB function circuit 35 is connected to the VSS terminal, VSS terminal, D+ terminal, D− terminal, VREG terminal, and the VBUS terminal. The CPU and peripheral circuit 36 is connected to the VCC and VSS terminals. The CPU and peripheral circuit 36 performs on-off control of the USB function circuit 35 based on the output of the ring oscillator 38. The ring oscillator 38 is connected to the VBUS and VSS terminals.

The resistance R1 whose one terminal is connected to the VREG terminal and the other terminal is connected to a USB communication line for transmission of the D− electrical potential is provided. The resistance R1 pulls up the D− electrical potential at the VREG electrical potential in the case of low rate USB communication.

Although not shown here, the detector 31 is connected to a personal computer through the plug 39, cable, and a plug in the personal computer is the same manner as explained with reference to the conventional detector.

Moreover, the D− electrical potential is pulled up to VREGX (R2/(R1+R2)) V and the D+ electrical potential is pulled down by the resistance R2, as there is no output by the resistance R1 and the resistance R2 of the personal computer together with the MCU 33 and the route hub of the personal computer in the case of no communication.

The detector 31 operates as follows. Potential VBUS functions as a power supply of the ring oscillator 38 for oscillation in a state where the cable is connected to the plug 39. The ring oscillator 38 outputs the VBUS detection signal to the CPU and peripheral circuit 36. The CPU and peripheral circuit 36 outputs the Enable signal to the USB function circuit 35, and the USB function circuit 35 outputs the output VREG of the built-in regulator.

When the detector 31 and the personal computer are not connected to each other, the ring oscillator 38 does not oscillate. Accordingly, whether the detector 31 and the personal computer are connected to each other can be detected based on monitoring of the difference in the oscillation output of the ring oscillator 38 between under a connection state and under a non-connection state of the cable.

According to the third embodiment, the similar advantages to those of the first embodiment may be expected by provision of the MCU comprising the ring oscillator.

Figure 4:
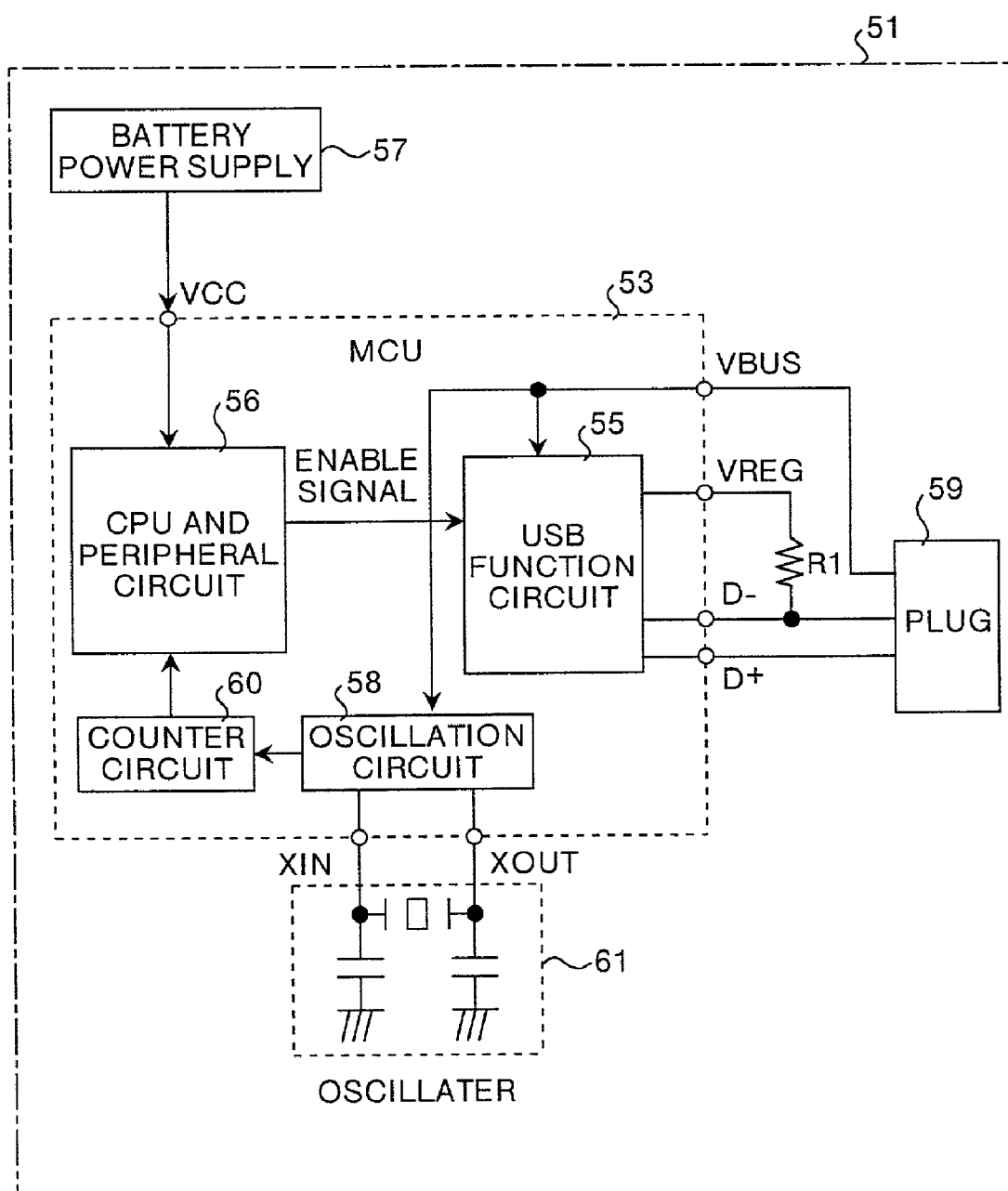
FIG. 4 is a block diagram of a detector according to a fourth embodiment.

FIG. 4 is a block diagram of a detector 51 according to a fourth embodiment of the present invention. The detector 51 comprises the MCU 53, battery power supply 57 for supplying of predetermined electrical potential to the MCU 53, plug 59 transmitting specific electrical potential to the MCU 53, and the oscillator (for example, ceramic or crystal-oscillation circuit, and, hereinafter, called as an oscillator) 61 for input/output of an oscillation signal to/from the MCU 53.

The MCU 53 comprises the USB function circuit 55, CPU and peripheral circuit 56, oscillation circuit 58, and the counter 60 for counting of the oscillation output from the oscillation circuit 58. Furthermore, the MCU 53 comprises a VCC terminal for input of a VCC level signal from the battery power supply 57, D+ terminal which is connected to the plug 59 for transmission of a D+ electric level, and a D− terminal which is connected to the plug 59 for transmission of a D−electric level. The MCU 53 also comprises a VREG terminal for transmission of an output VREG of a regulator built in the USB function circuit 55, and a VBUS terminal which is connected to the plug 59 for transmission of VBUS (electrical potential supplied from the personal computer). In addition, the MCU 53 comprises a XIN terminal, and a XOUT terminal for transmission of an oscillation signal which is input to the oscillation circuit 58 from the oscillator 61 and vice versa.

The USB function circuit 55 is connected to the D+ terminal, D− terminal, VREG terminal, and the VBUS terminal. The oscillation circuit 58 is connected to the VBUS terminal, XIN terminal, and the XOUT terminal. The oscillation circuit 58 performs transmission of the oscillation output to the counter 60. The CPU and peripheral circuit 56 is connected to the VCC terminal. The CPU and peripheral circuit 56 performs on-off control of the USB function circuit 55 based on the output of the counter 60.

The resistance R1 whose one terminal is connected to the VREG terminal, and the other terminal is connected to a USB communication line for transmission of the D− electrical potential is provided. The resistance R1 pulls up the D− electrical potential at the VREG electrical potential in the case of low rate USB communication.

Although not shown here, the detector 51 is connected to a personal computer through the plug 59, cable, and a plug in the personal computer is the same manner as explained with reference to the conventional detector.

Moreover, the D− electrical potential is pulled up to VREGX (R2/(R1+R2)) V and the D+ electrical potential is pulled down by the resistance R2, as there is no output by the resistance R1 and the resistance R2 of the personal computer together with the MCU 53 and the route hub of the personal computer in the case of no communication.

The detector 51 operates as follows. Potential VBUS is supplied to the oscillation circuit 58 for oscillation in a state where the cable is connected to the plug 59. Oscillation output from the oscillation circuit 58 is input to the counter 60 which outputs a detection signal to the CPU and peripheral circuit 56 after a predetermined number of counts. That is, the CPU and peripheral circuit 56 may detect the connection state of the cable by overflow of the counter 60. The CPU and peripheral circuit 56 outputs the Enable signal to the USB function circuit 55, and the USB function circuit 55 outputs the output VREG of the built-in regulator.

When the detector 51 and the personal computer are not connected to each other, the oscillation circuit 58 does not oscillate. Accordingly, whether the detector 51 and the personal computer are connected to each other can be detected by confirmation, with the CPU and peripheral circuit 56, of a counting state where oscillation output from the oscillation circuit 58 under the connection state of the cable is counted by a counter 60.

According to the fourth embodiment, the similar advantages to those of the first embodiment may be expected by provision of an MCU comprising the oscillation circuit for transmission of an input/output from/to the oscillator; and a counter for input from the oscillation output from an oscillation circuit.

Figure 5:
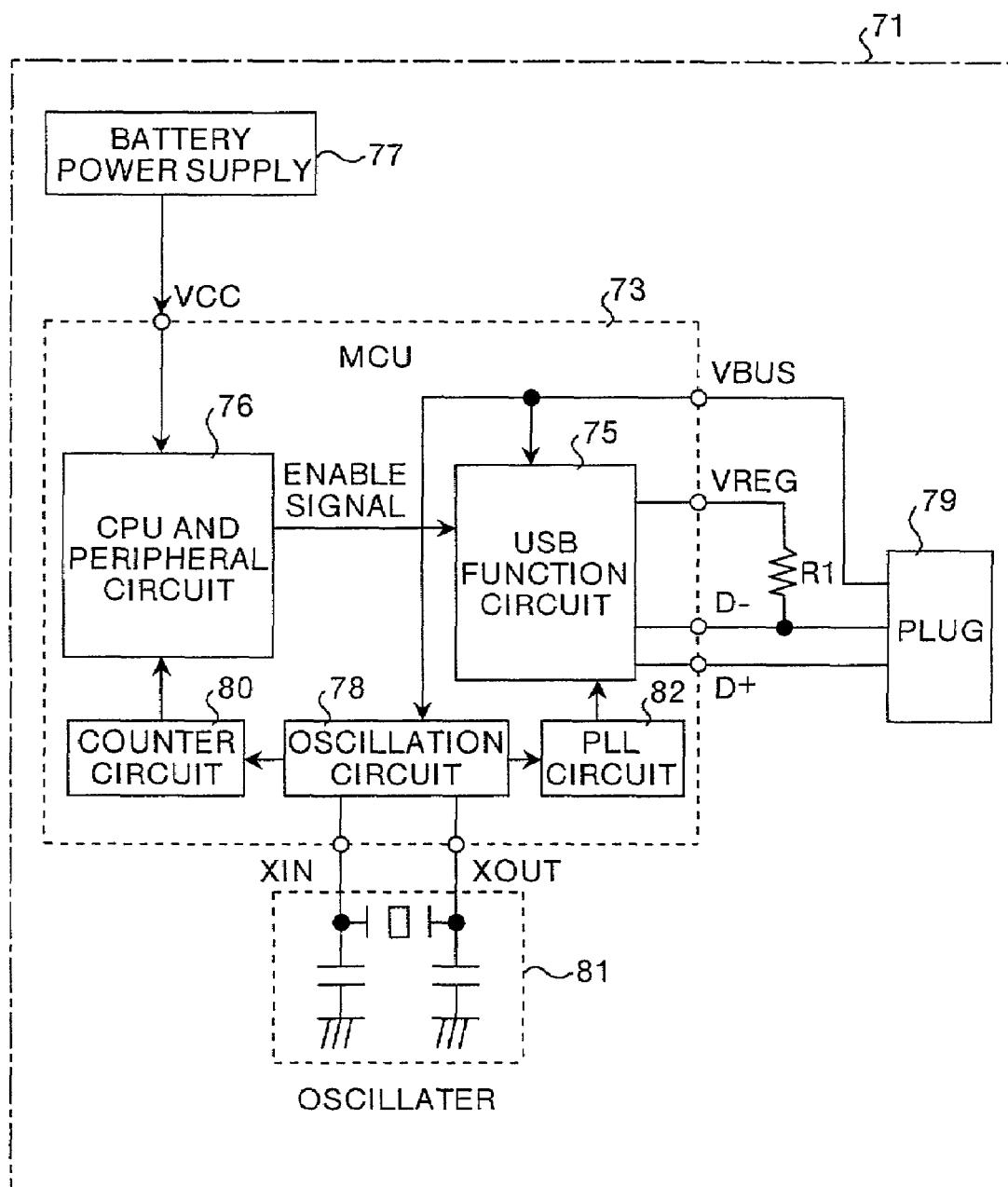
FIG. 5 is a block diagram of a detector according to a fifth embodiment.
Figure 6:
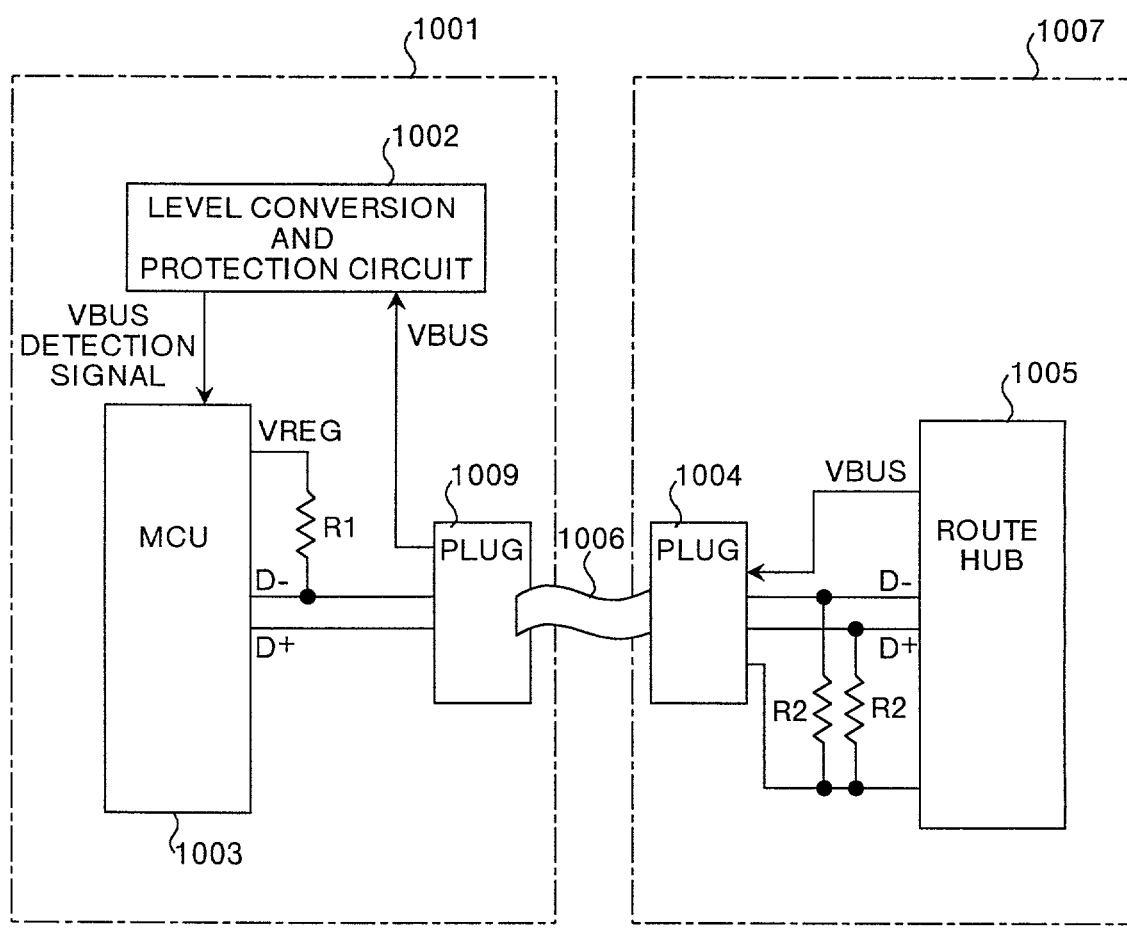
FIG. 6 is a block diagram showing a connection between a personal computer and a conventional detector.

FIG. 5 is a block diagram of a detector 71 according to a fifth embodiment of the present invention. The detector 71 comprises MCU 73, battery power supply 77 for supplying of predetermined electrical potential to the MCU 73, plug 79 transmitting specific electrical potential to the MCU 73, plug 79 for transmission of specific electrical potential to the MCU 73, and the oscillator 81.

The MCU 73 comprises the USB function circuit 75, CPU and peripheral circuit 76, oscillation circuit 78, counter 80 for counting of the oscillation output from the oscillation circuit 78, and the PLL circuit 82 for generation of a clock for operations of the USB function circuit 75 by frequency multiplication of the oscillation output from the oscillation circuit 78. Furthermore, the MCU 73 comprises a VCC terminal for input of a VCC level signal from the battery power supply 77, D+ terminal which is connected to the plug 79 for transmission of a D+ electric level, and a D– terminal which is connected to the plug 79 for transmission of a D– electric level. The MCU 73 also comprises a VREG terminal for transmission of the output VREG of a regulator built in the USB function circuit 75, and a VBUS terminal which is connected to the plug 79 for transmission of VBUS (electrical potential supplied from the personal computer). In addition, the MCU 73 comprises a XIN terminal, and a XOUT terminal for transmission of an input/output signal which is input to the oscillation circuit 78 from the oscillator 81 and vice versa.

The oscillation circuit 78 is connected to the VBUS terminal, XIN terminal and the XOUT terminal. The oscillation circuit 78 performs transmission of the oscillation output to the counter 80 and the PLL circuit 82. The USB function circuit 75 is connected to the D+ terminal, D– terminal, VREG terminal, and the VBUS terminal. The PLL circuit 82 supplies a clock to the USB function circuit 75.

The CPU and peripheral circuit 76 is connected to the VCC terminal. The CPU and peripheral circuit 76 performs on-off control of the USB function circuit 75 based on the output of the counter 80.

The resistance R1 whose one terminal is connected to the VREG terminal and the other terminal is connected to a USB communication line for transmission of the D–electrical potential is provided. The resistance R1 pulls up the D– electrical potential at the VREG electrical potential.

Although not shown here, the detector 71 is connected to a personal computer through the plug 79, cable, and a plug in the personal computer is the same manner as explained with reference to the conventional detector.

Moreover, the D– electrical potential is pulled up to VREGX (R2/(R1+R2)) V and the D+ electrical potential is pulled down by the resistance R2, as there is no output by the resistance R1 and the resistance R2 of the personal computer together with the MCU 73 and the route hub of the personal computer in the case of no communication.

The detector 71 operates as follows. Potential VBUS is supplied to the oscillation circuit 78 for oscillation in a state where the cable is connected to the plug 79. Oscillation output from the oscillation circuit 78 is input to the counter 80 which outputs a detection signal to the CPU and peripheral circuit 76 after a predetermined number of counts. The PLL circuit 82 that outputs a clock for operations to the USB function circuit 75 by input and frequency multiplication of the oscillation output from the oscillation circuit 78. The CPU and peripheral circuit 76 outputs the Enable signal to the USB function circuit 75, and the USB function circuit 75 outputs the output VREG of the built-in regulator.

When the detector 71 and the personal computer are not connected to each other, the oscillation circuit 78 does not oscillate. Accordingly, whether the detector 71 and the personal computer are connected to each other can be detected by confirmation, with the CPU and peripheral circuit 76, of a counting state where oscillation output from the oscillation circuit 78 under the connection state of the cable is counted by a counter 80.

According to the fifth embodiment, more intelligent connection detection, compared with that of the fourth embodiment, may be realized by provision of the MCU provided with the oscillation circuit for transmission of the input/output form the oscillator; the counter for input of the oscillation output from the oscillation circuit; and the PLL circuit for generation of a clock for operations of the USB function circuit by frequency multiplication of the oscillation output from the oscillation circuit.

Moreover, when a clock for operations of the USB function circuit is commonly used as the oscillation output from the oscillation circuit, a specially dedicated oscillation circuit may be eliminated, as only a counter is required for a circuit functioning only as detection unit.

In addition, there is also an advantage that the clock for operations of the USB function circuit is commonly used as the oscillation circuit for detection of whether the detector 71 and the personal computer are connected to each other.

According to a sixth embodiment of the present invention, the detector comprises a MCU that includes a comparator instead of the A-D converter shown in FIG. 2. Other configuration is the same as that shown in FIG. 2. However, the threshold for the comparator is assumed to be controlled enough to detect the difference of the D– electrical potential between a connection state and a non-connection state of the cable.

Whether the detector according to the sixth embodiment and the personal computer are connected to each other can be detected by detection, with the inverter, of the difference in the D– electrical potential between the connection state and the non-connection state of the cable.

Thus, according to the sixth embodiment, more intelligent connection detection, than that of the second embodiment, may be realized by provision of the MCU comprising the comparator. The comparator has a simpler configuration as compared to the A-D converter, therefore, cost reduction becomes possible, and circuit becomes simple.

According to a sixth embodiment of the present invention, the detector comprises a MCU that includes an inverter instead of the A-D converter shown in FIG. 2. Other configuration is the same as that shown in FIG. 2. However, the threshold for the inverter is assumed to be designed enough to detect the difference of the D− electrical potential between a connection state and a non-connection state of the cable.

Whether the detector according to the seventh embodiment and the personal computer are connected to each other can be detected by detection, with the inverter, of the difference in the D− electrical potential between the connection state and the non-connection state of the cable.

According to the seventh embodiment, more intelligent connection detection, than that of the second embodiment, may be realized by provision of the MCU comprising the inverter.

Moreover, the detection function may be realized by using an inverter with appropriately adjusted threshold (enough to detect the changes in the D− electrical potential), that is, by a simpler configuration than that of a comparator according to the sixth embodiment.

As explained above, according to the detector of one aspect of this invention, intelligent and small-sized detector with low power consumption is obtained. Furthermore, a dedicated circuit for detection that is used conventionally is not required.

Also, the MCU is provided with the control function as a peripheral device. The peripheral device is activated using built-in battery and the operation of the USB function circuit is stopped when the detector and the personal computer are not connected, thereby achieving reduction in the power consumption. Furthermore, when the detector and the personal computer are connected, the operation of the USB function circuit is restarted, and the battery is charged by the potential from the personal computer.

Furthermore, a A-D converter is provided which may be commonly used if the peripheral device requires A-D conversion. The A-D converter may be replaced with a comparator. The comparator has a simpler configuration as compared to the A-D converter. Furthermore, the A-D converter may be replaced with an inverter. The inverter has a simpler configuration as compared to the A-D converter.

According to the method of another aspect of this invention, fine detection of the connection with low power consumption may be efficiently performed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A detector for detecting a wire connection with a personal computer, the detector comprising:
    a plug for connecting the detector to the personal computer through a cable;
    a battery power supply which outputs a predetermined constant electrical potential; and
    a Micro Control Unit which receives a specific electrical potential from the personal computer through the plug and cable, and receives the constant electrical potential from the battery power supply, wherein the Micro Control Unit comprises:
        a CPU and peripheral circuit which receives the constant electrical potential from the battery power supply, wherein the CPU and peripheral circuit is operated by electrical potential supplied from the battery power supply;
        a USB function circuit which receives the specific electrical potential from the personal computer, wherein the USB function circuit is on-off controlled by the CPU and peripheral circuit, wherein the USB function circuit is operated by only electrical potential supplied from the personal computer; and
        a detection circuit which detects a voltage level of the specific electrical potential from the personal computer and outputs an electrical potential to the CPU and peripheral circuit based on the detected voltage level.

2. The detector according to claim 1, wherein the Micro Control Unit comprises:
    an A-D converter which receives the specific electrical potential from the personal computer and the constant electrical potential from the battery power supply, receives a differential signal, and outputs an electrical potential to the CPU and peripheral circuit based the received electrical potentials and the differential signal.

3. The detector according to claim 1, wherein the Micro Control Unit comprises:
    a ring oscillator which receives the specific electrical potential from the personal computer and the constant electrical potential from the battery power supply, and outputs an electrical potential to the CPU and peripheral circuit based the received electrical potentials.

4. The detector according to claim 1, wherein the Micro Control Unit comprises:
    a comparator which receives the specific electrical potential from the personal computer and the constant electrical potential from the battery power supply, receives a differential signal, and outputs an electrical potential to the CPU and peripheral circuit based the received electrical potentials and the differential signal.

5. The detector according to claim 1, wherein the Micro Control Unit comprises:
    an inverter which receives the specific electrical potential from the personal computer and the constant electrical potential from the battery power supply, receives a differential signal, and outputs an electrical potential to the CPU and peripheral circuit based the received electrical potentials and the differential signal.

* * * * *